United States Patent [19]

Kubilius et al.

[11] 4,013,039
[45] Mar. 22, 1977

[54] WET PROCESSING PH CONTROL

[75] Inventors: Fabian Kubilius, Poughkeepsie; Gary Frank Pavlovic, Beacon; Jerome Woolf, Newburgh, all of N.Y.

[73] Assignee: International Business Machines Corporation, Armonk, N.Y.

[22] Filed: Sept. 2, 1976

[21] Appl. No.: 719,777

[52] U.S. Cl. .................................. 118/7; 118/314; 137/93
[51] Int. Cl.² ........................................ B05C 11/10
[58] Field of Search ............ 118/7, 313, 314, 315, 118/DIG. 23, 637, 223; 134/61; 137/4, 5, 8, 9, 88, 93; 324/30, 31

[56] References Cited
UNITED STATES PATENTS

| | | | |
|---|---|---|---|
| 3,368,525 | 2/1968 | Sacre | 118/637 |
| 3,452,710 | 7/1969 | Hentschel | 118/7 |
| 3,554,212 | 1/1971 | Maroney | 137/93 |
| 3,677,222 | 7/1972 | Komori | 118/7 |

Primary Examiner—Louis K. Rimrodt
Attorney, Agent, or Firm—William J. Dick

[57] ABSTRACT

Disclosed is a wet processing station in which control of the PH of the processor liquid is mandatory within predetermined limits, the processor including a tank having means to subject product to a bath of processing liquid. A PH monitoring probe is positioned in the tank with a pump in the tank for mixing processing liquid therein. The pump has a liquid intake and a discharge, the intake being positioned closely adjacent to the probe so that liquid being mixed in the tank will flow across the probe into the intake of the pump. A processing liquid concentrate holder is coupled to liquid concentrate carrying means which connect the holder to the probe, the liquid carrying means having an outlet which is positioned to discharge concentrated processing liquid directly onto the probe. Probe monitoring means which is responsive to the output of the PH monitoring probe provides a signal output when the PH of the processing liquid reaches at least a predetermined lower limit. A process liquid concentrate control means coupled to the liquid concentrate holder is responsive to the signal output of the probe monitoring means to apply a concentrated measure or dose of process liquid to the probe. A timer is coupled to the first signal output of the probe monitoring means to interrupt the signal output for a predetermined period of time upon the concentrated dose of process liquid being applied to the probe to thereby insure mixing of the solution within the tank prior to the probe monitoring means being effective to add another measure of concentrated process liquid to the tank.

9 Claims, 3 Drawing Figures

WET PROCESSING PH CONTROL

SUMMARY OF THE INVENTION AND STATE OF THE PRIOR ART

The present invention relates to wet processing stations, and more particularly relates to apparatus for controlling the PH of a processing liquid within predetermined limits within the station.

In the manufacture of A.C. type gas panels, wherein the finished panel has a front and back glass plate with a cavity therebetween filled with an ionizable gas, (e.g. neon-argon mixture), a plurality of conductive electrodes are placed in confronting, spaced apart orthogonal relation so that the intersection of the lines are at right angles one to the other on the confronting surfaces of the front and back plates. In manufacturing such a panel, numerous process steps are required, the monitoring of which is extremely critical, especially as the panel becomes structurally closed to completion.

Initially, glass plates which correspond to the front and back of the panel are thoroughly cleaned and successive layers of chrome, copper and chrome are deposited on each plate entirely over one surface thereof. The plates are then covered with a photo-resist which is baked onto the surface of the chrome and thereafter, utilizing conventional exposure techniques, the photo-resist is exposed through a mask. The photo-resist is then developed, goes through a rinse cycle and then is post-baked to prepare the panel for etching and then the chrome is etched, the copper is etched and the chrome is etched, leaving individual parallel lines on the surface of the panel, followed by a stripping step in which the developed photo-resist on the lines is removed. The chrome is conventionally etched by a potassium permanganate sodium hydroxide solution, while the copper is etched by an amonium persulfate solution, the strip operation being accomplished with a sodium hydroxide solution.

The first critical operation involves the developing of the exposed chromium-copper-chromium plate. Depending upon the type of photo-resist used, for example, if the plate is overdeveloped too much resist is washed out and the result is narrow lines with the possibility of opens occurring during the etch cycle; alternatively, if the plate is underdeveloped not enough resist is removed and the result is shorts between the closely spaced lines. The type of photo-resist which may be employed, as one example, is a Shipley type positive photo-resist with novalak$^{tm}$ alkaline soluble resin. The developer for the positive photo-resist is sodium meta silicate and sodium ortho phosphate-5% solution, with a PH of between 12.7 and 13. (the developer comprises a sodium meta silicate [$NA_2SiO_3 . 5H_2O$], disodium hydrogen phospate [$NA_2HPO_4 . 7H_2O$], and sodium hydroxide [$NAOH$]). In order to prevent either over or underdeveloping of the exposed photo-resist, its important that the PH of the developer remain relatively constant at approximately 12.7.

The etching requirement for metal is much the same and requires an accurate control over the PH of the processing liquid or etchant, just as with the processing liquid when it is a developer. In order to insure uniform and consistent results it is essential that the PH be maintained within 0.05 of its desired value. Heretofore this was accomplished manually by dumping the processing liquid mixture at predetermined intervals and reloading the processing tank with a new batch at the correct PH level. Alternatively, the PH solution has been maintained by depositing a discrete amount of the material necessary to raise the PH in the solution and mixing thoroughly and then retesting until the PH of the solution is at the desired level. Such a method is at best crude and at worst leads to such variations in the PH level as to make the solution, at least in part, unpredictable with a concomitant variation in consistency as it passes through the developer or etcher.

There are numerous operational systems on the market today for directly reading the PH of a solution, and setting an alarm, either visual or oral to indicate that the PH level is too low. Unfortunately in each of those instances, in order to reset the alarm it is necessary to raise the PH level at least by 0.2 on the PH scale. Thus if a reset occurs only after a 0.2 PH level change, it is difficult if not impossible with existing technology to maintain the PH level within the required 0.05 range limitation.

In view of the above, it is a principal object of the present invention to provide novel apparatus for a wet processing station in which the PH level of the solution or mixture within the tank may be maintained within 0.05 or better even utilizing standard off the shelf electrodes and probes.

Another object of the present invention is to provide novel apparatus which by the positioning of the various elements within the apparatus will permit self-cleaning of the electrode or probe which is monitoring the PH level in a mixture or solution, so as to inhibit false readings by the electrode.

Yet another object of the present invention is to provide novel apparatus which will permit close monitoring of the PH level within a wet processing station and permit automatic doping or dosing of the tank while maintaining accurate readings of the mixture within the tank after a thorough mixing of the liquid within the tank is obtained.

Other objects and more complete understanding of the invention may be had by referring to the following specification and claims taken in conjunction with the accompanying drawings in which:

Figure 1:
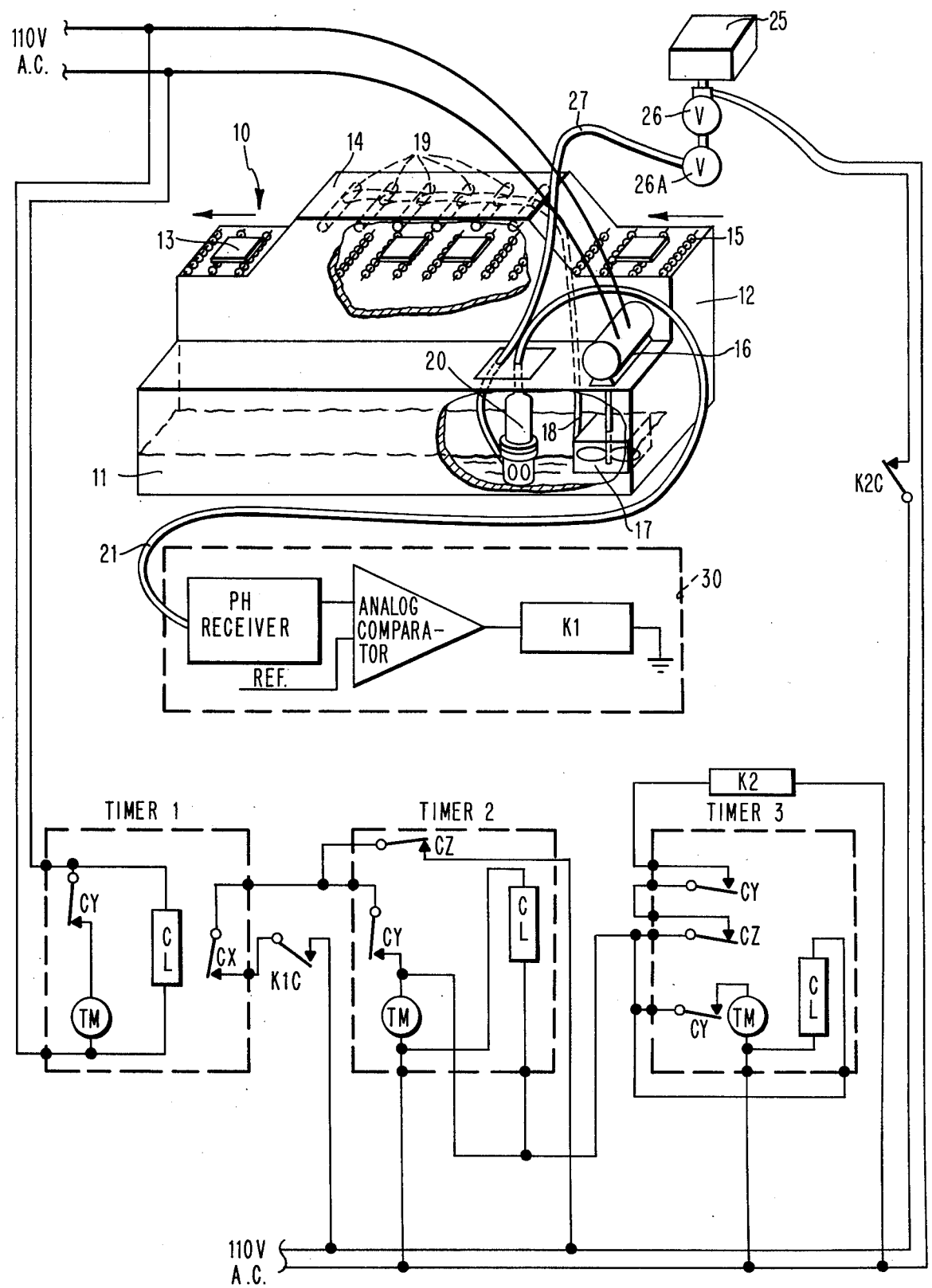
FIG. 1 is a fragmentary schematic view of a typical wet processing station and illustrating apparatus constructed in accordance with the present invention.

Turning now to the drawings, and especially FIG. 1 thereof, a wet processing station 10 in which control of the PH of a processing liquid 11 is mandatory within predetermined limits, is shown therein. As illustrated, the processing station 10 comprises a tank 12 having means to subject product 13 to a bath of processing liquid. As illustrated, the product 13, in the present instance glass plates for gas panels, passes through a chamber 14 which covers the tank 12, as on a conveyor 15. A conventional pump 16 having a processing liquid intake 17 includes a discharge line 18 which conveys the processing liquid in the tank to, in the illustrated instance, a plurality of spray heads 19 which subject the product 13 to a bath of the processing liquid.

In order to maintain the PH of the processing liquid 11 within predetermined and prescribed limits so as, for example, to obtain uniform etching or developing of the product 13, means are provided for monitoring the PH level in the bath of processing liquid and for periodically dosing the process liquid, when called for by the monitoring means so as to maintain a predetermined PH level in the tank 12. To this end, and in accordance with one feature of the invention, a PH monitoring probe 20 is positioned in the processing tank 12 with its probes submerged in the processing liquid 11. The probe is placed closely adjacent the intake 17 of the pump 16 so that a higher velocity flow of the liquid 11 will pass across the electrodes contained in the probe helping to maintain the probe free of deposits or other contaminants. (A typical probe structure and its construction will be described hereinafter relative to FIG. 2). The probe 20 has a monitoring output 21 which connects directly to probe monitoring means 30 which are responsive to the output of the PH monitoring probe to provide a first signal output when the PH of the processing liquid reaches at least a predetermined lower limit. A liquid concentrate holder 25, for holding a concentrated liquid capable of increasing the PH of the processing liquid such as NAOH, is coupled through a solenoid actuated valve 26 and gate valve 26A to liquid carrying means 27 which discharge the concentrated liquid when called for, directly to the probe, and more specifically onto the electrodes contained within the probe.

The probe monitoring means 30 as well as the electrode mounting assembly or probe 20 are purchased items and may be directly obtained from Leeds and Northrup Corporation in North Wales, Pa., the probe being a multi-purpose electrode mounting assembly Leeds and Northrup Model 7773-4-7-22-2.

Figure 2:
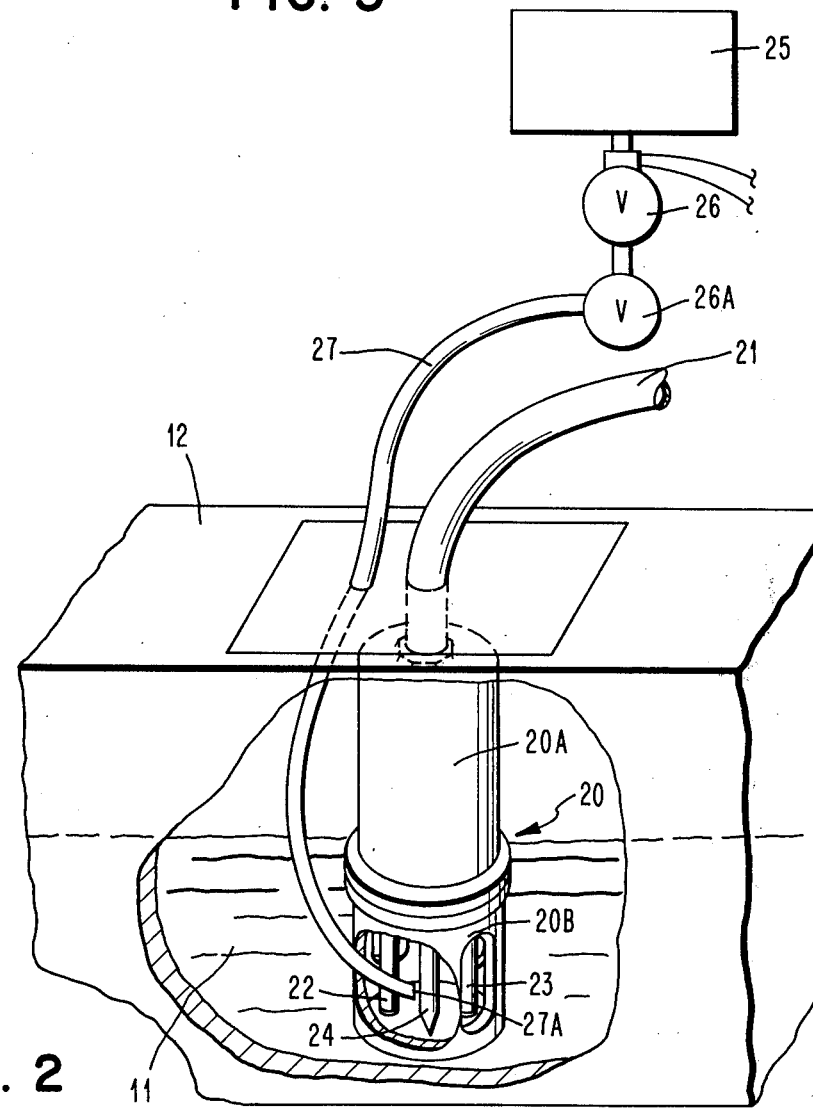
FIG. 2 is an enlarged fragmentary perspective view of a portion of the apparatus illustrated in FIG. 1.

The structure of the probe is best shown in FIG. 2 and includes a casing 20A having an apertured bottom protector 20B which houses a reference electrode 22, a temperature compensator 23 and the reference or measuring electrode 24. As shown best in FIG. 2, the discharge or liquid carrying means 27 has a discharge opening 27A so as to apply the concentrated processing liquid from the processing liquid concentrate holder 25 directly onto the measuring electrode 24. The output of the probe 20 is directly coupled to the probe monitoring means 30 which also may be directly purchased from Leeds and Northrup Corporation, in the present instance the probe monitoring means including a model 7075-3 PH receiver which includes an analog comparator which transmits a signal output at the predetermined lower processing PH limit to energize a relay K1 therein.

Upon a low level alarm being given, energization of the relay K1 effects energization of a relay K2 which closes contacts K2C for energizing the solenoid valve 26 to allow the concentrated processing liquid to be carried to the probe.

In order to insure proper mixing of the processing liquid 11 in the tank 12 prior to dosing of the tank; and in order to permit time for the spiking solution to mix properly before a second spike may occur; and to insure a predetermined timed dose of spikant or concentrated processing liquid onto the probe before the next spiking may take place, the timers designated "timer 1", "timer 2" and "timer 3" respectively are employed. The functions of timers 2 and 3 are specifically to allow a complete mixing action of the liquid 11 in the tank and the raising of the PH thereof in increments that are less (e.g., 0.05) than the sensitivity of the probe 20 in conjunction with the probe monitoring means 30 would normally allow. For example, with the probe utilized it requires approximately a 0.2 change in PH level before a new accurate reading may be obtained which would mean that the entire solution would have to be raised 0.2 before a reset would occur which would make it impossible to control the PH to a 0.05 level. The function of timer 1 on the other hand, is to permit, upon start up, a predetermined time to elapse (e.g., the pump to run and effect mixing of the solution in the tank) before the probe reading will be effective to deposit an additional dose of spikant into the tank.

To this end, and to facilitate reading of the schematic diagram illustrated in the lower portion of FIG. 1, TM stands for timing motor, CL stands for clutch, CY, CX and CZ are contacts within the timers which will function as per the following description. Each of the timers may be purchased from Eagle Signal Corporation at 736 Federal Street, Davenport, Iowa 52803 and are a model HP5. Of course, other timers or circuits may be employed to effect the same type of control as hereinafter described. With the contacts as lettered, the operation of the timers becomes clear when it is considered that the contacts CY are open when the timer has timed out; the contacts designated CX are closed when the timer has timed out and the contacts CZ are closed when the timer is operating and when the timer has timed out.

With the above in mind, upon application of 110 volts AC or power to the pump 16, timer no. 1 goes into operation and the contact CY is closed. Meanwhile contact CX in timer no. 1 is open permitting mixing of the processing liquid 11 in the tank 12 for a predetermined period of time (e.g., 15 minutes). Accordingly, spiking will not occur on start up because the probe may give a false reading. Additionally, this requires that a certain quantity of processing liquid in the tank will pass across the probe to clean it at start up before the relay K1 will be effective to start the action of the concentrated processing liquid coming from the concentrated processing liquid holder 25. With the opening of contact CY timer no. 1 upon the timer timing out, contact CX closes closing the circuit for the contacts K1C of relay K1 and energizing, if spiking is called for by relay K1, timer no. 2. The contacts K1C for relay K1 will close if a low level signal is then received from the probe 20. When the contacts are closed, timer no. 2 commences operation and contact CZ associated with timer no. 2 are now closed forming the holding circuit for that timer until the timer has timed out. As may be seen from the drawing, the starting of timer no. 2 also energizes timer no. 3 and the timing motor therein closing the contact CZ and causing relay K2 to be energized thereby closing contacts K2C and energizing or opening the solenoid valve 26. Solenoid valve 26 will stay open for the length of time of the timer no. 3 and allow a predetermined dose or quantity of concentrated liquid to be applied directly to the probe 20. Inasmuch as the concentrated liquid seen by the probe will raise the PH level output of the probe by more than 0.2 the receiver will be reset. But because timer no. 2 has not as yet timed out, relay K2 may not again be energized until timer no. 2 has timed out. In this manner thorough mixing of the liquid in the tank occurs.

Figure 3:
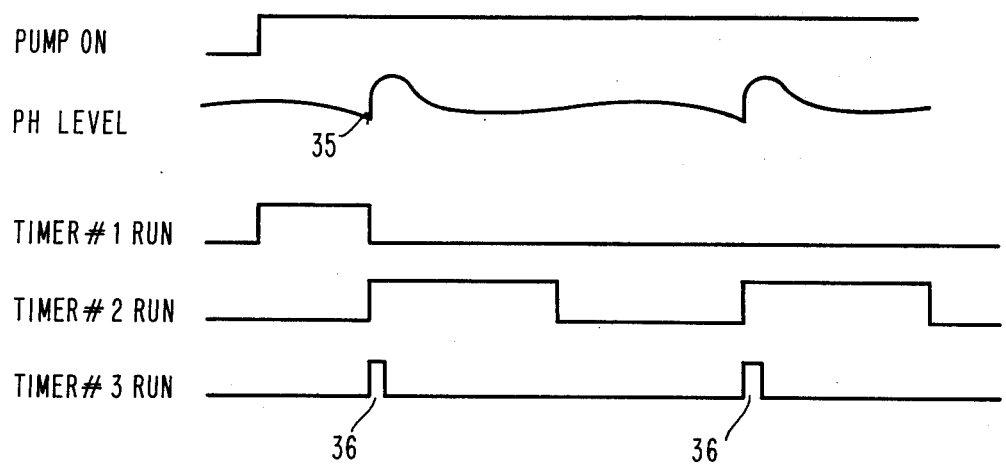
FIG. 3 is a timing chart illustrating the operation of the apparatus shown in FIG. 1.

The chart in FIG. 3 is descriptive of the operation of the system illustrated in FIG. 1. For example, when the pump goes on timer no. 1 goes on as shown by the raised level on the chart. At the time of start-up the PH level may be at a higher level near the probe but gradually decreases as mixing occurs. Additionally with the pump on and timer no. 1 running the probe output is ineffective to cause any spiking to occur even though K1 is picked. If a low level occurs as at 35, and timer no. 1 has been timed out, with a low level PH reading at the probe after the thorough mixing which has been insured by timer no. 1, relay K1 will be energized effecting a closing of contacts K1C and the commencement of timing of timer no. 2. Simultaneously, as may be seen, timer no. 3 is energized as at 36 causing a timed dosing from the concentrate holder tank 25.

Thereafter, because timer no. 2 has not timed out, even if a low PH level reading takes place, no additional energization of timer no. 3 may take place at least until thorough mixing has occurred as insured by timer no. 2 timing out. For the purposes of clarity, an additional cycle of operation is illustrated in the timing chart.

Thus with the apparatus of the present invention, the PH level of a processing liquid may be accurately controlled using conventional hardware combined in a novel manner. By the use of a controlled timed dose of concentrate the PH of the processing solution may be controlled, and by insuring that no additional dosage will occur until a thorough mixing takes place those increments of increase in the level of the PH in the liquid may be controlled in very fine incremental steps.

Although the invention has been described with a certain degree of particularity, it is understood that the present disclosure has been made only by way of example and that numerous changes in the details of construction and the combination and arrangement of parts and the mode of operation may be made without departing from the spirit and the scope of the invention as hereinafter claimed.

What is claimed is:

1. A wet processing station in which control of the PH of the processor liquid is mandatory within predetermined limits, said processor comprising: a tank having means to subject product to a bath of processing liquid; a PH monitoring probe in said tank; a pump in said tank for mixing processing liquid therein, said pump having a processing liquid intake and a discharge, said intake being positioned closely adjacent said probe so that liquid being mixed in said tank by said pump will flow across said probe; a liquid concentrate holder for holding a liquid concentrate capable of increasing the PH of the processing liquid, and liquid carrying means connecting said holder to said probe, said liquid carrying means having an outlet positioned to discharge said liquid concentrate directly onto said probe; probe monitoring means responsive to the output of said PH monitoring probe to provide a first signal output when the PH of said processing liquid reaches at least a predetermined lower limit; process liquid concentrate control means coupled to said liquid concentrate holder and responsive to said signal output of said probe monitoring means to apply a predetermined dose of said liquid concentrate to said probe; timer means to interrupt the first signal output of said probe monitoring means for a predetermined period of time upon said dose of liquid concentrate being applied to said probe to insure mixing of the processing liquid within said tank prior to said probe monitoring means being effective to add another dose of liquid concentrate to said tank.

2. A wet processing station in accordance with claim 1 including another timer means for delaying the operation of the process liquid concentrate control means for a predetermined time upon start-up of said pump.

3. A wet processing station in accordance with claim 2 wherein said process liquid concentrate control means comprises a solenoid actuated valve.

4. A wet processing station in accordance with claim 3 wherein said process liquid control means includes another timer to control the time of opening of said solenoid actuated valve.

5. A wet processing station in accordance with claim 1 wherein said means to subject product to a bath of processing liquid comprises a spray head connected to the discharge of said pump.

6. A wet processing station in accordance with claim 5 including a conveyor passing through said tank and underlying said spray head.

7. A wet processing station comprising a tank having a conveyor therein for passing product therethrough to be treated with a spray of processing liquid; a pump in said tank having an inlet and an outlet, a PH monitoring probe in said tank positioned closely adjacent the inlet of said pump so that processing liquid taken into said pump inlet will maintain the cleanliness of said probe; a liquid concentrate holder for holding a liquid concentrate capable of changing the PH of said processing liquid, and liquid carrying means connected to said holder and having an outlet positioned to discharge said liquid concentrate directly onto said probe; probe monitoring means responsive to the output of said PH monitoring probe to provide a first signal output when the PH of said processing liquid reaches a predetermined value; liquid concentrate control means coupled to said liquid concentrate holder; at least a pair of timer means, one of said timing means operative to actuate said liquid concentrate control means for a predetermined period of time to apply a dose of said liquid concentrate to said probe upon the receipt of said first signal output; the other of said timer means operative to interrupt said first signal output for a predetermined period of time upon said dose of liquid concentrate being applied to said probe to insure mixing of said processing liquid within said tank prior to said probe monitoring means being effective to add another dose of liquid concentrate to said tank.

8. A wet processing station in accordance with claim 7 including a third timer means for delaying the actuation of the process liquid concentrate control means for a predetermined period of time upon start-up of said pump.

9. A wet processing station in accordance with claim 8 wherein said process liquid concentrate control means comprises a solenoid actuated valve.

* * * * *